UNITED STATES PATENT OFFICE.

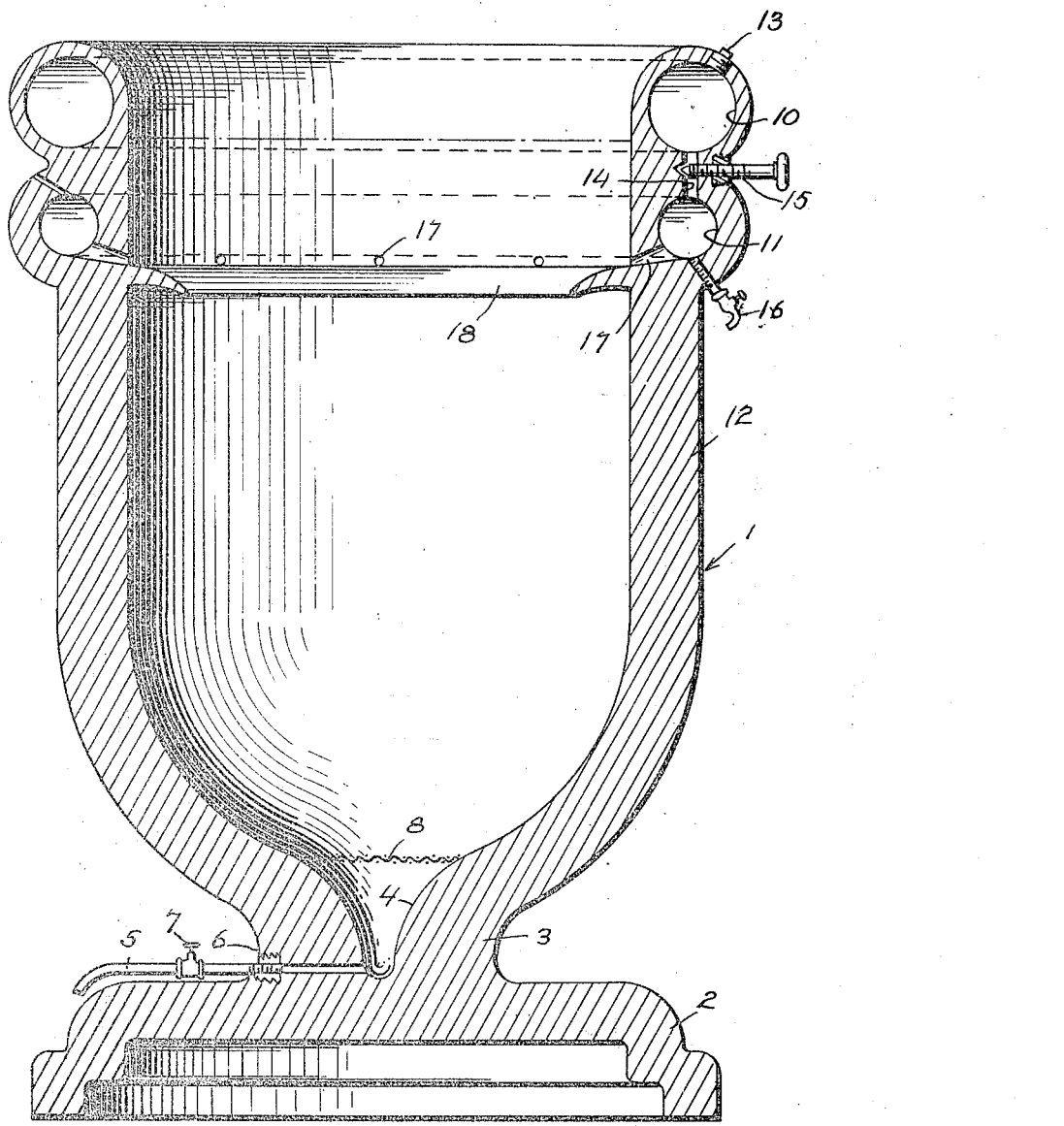

WILLIAM HUSTON MALONE AND RICHARD SMITHSON JENKINS, OF FORT MYERS, FLORIDA.

FLOWER-POT.

1,133,735.  Specification of Letters Patent.  Patented Mar. 30, 1915.

Application filed August 25, 1914. Serial No. 858,495.

*To all whom it may concern:*

Be it known that we, WILLIAM H. MALONE and RICHARD S. JENKINS, citizens of the United States, residing at Fort Myers, in the county of Lee and State of Florida, have invented certain new and useful Improvements in Flower-Pots; and we do hereby declare the following to be a full, clear, and exact description of the invention, such as will enable others skilled in the art to which it appertains to make and use the same.

This invention relates to flower pots and the primary object of the invention is the provision of a flower pot which has a pair of annularly extending raceways for retaining water or other suitable liquid which passes from one of the raceways into the other and from thence into the flower pot for nourishing the plant growing therein.

Another object of this invention is the provision of a valve mechanism interposed in the connection or communication between the two raceways for cutting off the flow of liquid into the flower pot when it is so desired.

A still further object of the invention is the provision of an annular inwardly extending flange, formed in the flower pot for deflecting the liquid or moistening fluid from the raceway into substantially the center of the pot for the efficient nourishing of the plant.

With the foregoing and other objects in view this invention consists in such novel features of construction, combination and arrangement of parts as will be hereinafter more fully described, illustrated in the accompanying drawings and claimed.

In describing the invention in detail reference will be had to the accompanying drawing, which shows a central section to a flower pot constructed in accordance with this invention, and in describing this view similar reference characters will be used for designating similar or corresponding parts.

Referring more particularly to the drawing, 1 designates a flower pot as an entirety, which is substantially cylindrical in shape as is ordinary in the construction of a flower pot of this nature and which has a supporting base 2 formed upon the lower end thereof. The supporting base 2 is formed in any desirable artistic design as desired and it has communications with the arcuate base of the pot 1 through a web like connection as is clearly shown in the drawing. The web like connection 3 between the supporting base 2 and the bottom or arcuate base of the flower pot 1 is provided with a recess 4 extending thereinto, which communicates with the interior of the flower pot 1 and with a pipe 5. The pipe 5 extends transversely through the web, is held in place by a packing nut 6, and projects beyond the edge of the base 2, so as to provide for the draining of the interior of the flower pot 1 if desired to do so. A valve mechanism 7 is interposed in the pipe 5 for controlling the draining of the flower pot 1.

A foraminous screen 8 is positioned across the mouth of the recess 4, which communicates with the interior of the flower pot 1 and this screen prevents the passage of soil or dirt from the flower pot into the recess 4 and the pipe 5. The flower pot 1 has two annular raceways 10 and 11 formed in the upper edge of its wall, which raceways are positioned one above the other as is clearly shown in the drawing. The raceway 10 which is positioned at the extreme upper edge of the flower pot wall 12 is provided for retaining a supply of nourishing fluid or liquid therein and it has an inlet opening 13, by means of which the fluid is inserted into the raceway 10. The raceway or waterway 11 has a vertically extending opening 14 communicant therewith which communicates with a retaining raceway 10 and is provided for permitting the nourishing liquid to flow from the retaining raceway 10 into the feeding raceway 11. A valve mechanism 15 is carried by the flower pot wall 12 and the valve thereof controls the passage of liquid from the retaining raceway 10 into the feeding raceway 11. The feeding raceway 11 has a stop cock 16 communicant with to provide for the letting off of the water out of the raceway when it is so desired.

The wall 12 of the pot has a plurality of openings 17 formed therein and spaced about the circumference of the inner surface of the wall or sides of the pot and communicating with the interior of the pot and the feeding raceway 11, so that the liquid passing into the raceway 11 through the opening 17 upon the annular flange 18 which is formed on the inner surface of the wall 12 of the flower pot and extends inwardly toward the center of the same. The flange 18 has its upper surface arcuate, tapering downwardly as it extends toward the center of the pot so as to feed or carry the nourishing liquid toward the center of the pot to prevent the same from seeping down around the edges of the dirt (not shown) which is placed in the pot to provide for the nourishment or irrigation of the plant growing within the pot.

In the application of the improved flower pot heretofore described, the plant (not shown) is placed within dirt or suitable loam, which is retained by the wall 12 of the pot and which is placed therein so that the upper edge of the ground or loam will extend above the flange 18 and be positioned a short distance inwardly from the top edge of the wall 12 of the pot. The irrigating liquid is poured into the retaining raceway 10 through the inlet 13, and by the regulation of the valve 15, the amount of fluid or liquid which flows from the retaining raceway 10 into the feeding raceway 11 may be controlled. The nourishing liquid flowing into the feeding raceway 11 will pass outwardly into the interior of the pot 1 through the opening 17, and being deflected toward the center of the pot by the flange 18, thereby efficiently nourishing and irrigating the plant which is growing in the pot. In case the pot is to be placed outdoors where rain will meet the same, it may be desired to cut off the flow of the irrigating fluid into the pot in case of rain and this is done by the regulating of the valve 15 so as to completely cut off the flow of liquid through the opening 14. The interior of the flower pot may be drained by the opening of the valve 15 allowing the water or irrigating liquid to flow out of the same, such liquid passing through the recess 4.

From the foregoing description taken in connection with the accompanying drawings the advantages of the construction and of the method of operation of the improved flower pot will be readily apparent to those skilled in the art to which this invention appertains and, while in the foregoing description, the principle of the operation of this invention has been described together with various features of construction, it is to be understood that certain minor features of construction, combination and arrangement of parts may be altered to suit practical conditions provided such alterations are comprehended within the scope of what is claimed.

What is claimed is:—

1. In a flower pot structure, a wall forming a retaining flower pot having an irrigating liquid retaining raceway formed in the upper edge of said flower pot and a feeding raceway formed in the wall of said flower pot and positioned beneath said retaining raceway, said flower pot wall being provided with an opening providing communication between said raceway for permitting the feeding of irrigating fluid from said retaining raceway into said feeding raceway, said flower pot wall being provided with a plurality of circumferentially spaced openings which communicate with said feeding raceway to permit of the feeding of the irrigating fluid into the interior of said flower pot, and an inwardly extending flange formed directly beneath said circumferentially spaced openings for guiding the irrigating fluid toward the center of said flower pot.

2. In a flower pot structure, a wall forming a retaining flower pot having an irrigating liquid retaining raceway formed in the upper edge of said flower pot and a feeding raceway formed in the wall of said flower pot and positioned beneath said retaining raceway, said flower pot wall being provided with an opening providing communication between said raceways for permitting the feeding of irrigating fluid from said retaining raceway into said feeding raceway, said flower pot wall being provided with a plurality of circumferentially spaced openings which communicate with said feeding raceway to permit of the feeding of the irrigating fluid into the interior of said flower pot, an inwardly extending flange formed directly beneath said circumferentially spaced opening for guiding the irrigating fluid toward the center of said flower pot, and a valve mechanism interposed in said wall for controlling the flow of irrigating fluid from said retaining raceway into said feeding raceway.

In testimony whereof we affix our signatures in presence of two witnesses.

WILLIAM HUSTON MALONE.
RICHARD SMITHSON JENKINS.

Witnesses:
H. G. HENDREY,
S. C. HEADLEY.